US006487614B2

(12) United States Patent

Nobutani et al.

(10) Patent No.: US 6,487,614 B2
(45) Date of Patent: *Nov. 26, 2002

(54) INTERFACE CONTROL SYSTEM FOR EXCHANGING SIGNALS BY SUPERPOSING SIGNALS TO AN EXISTED SIGNAL LINE USING LOW VOLTAGE DIFFERENTIAL SIGNAL

(75) Inventors: Toshiyuki Nobutani, Yokohama; Nobuharu Ichihashi, Atsugi, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,791

(22) Filed: Mar. 13, 1998

(65) Prior Publication Data

US 2002/0026542 A1 Feb. 28, 2002

(30) Foreign Application Priority Data

Mar. 25, 1997 (JP) ............................................ 9-072063

(51) Int. Cl.[7] .......................... G06F 3/00; G06F 13/00; H04L 5/14; G09G 1/06

(52) U.S. Cl. .............................. 710/20; 710/7; 710/21; 710/129; 345/10; 345/127; 370/294

(58) Field of Search ........................... 710/1, 7, 12, 20, 710/71, 129; 370/294, 295; 345/10, 127

(56) References Cited

U.S. PATENT DOCUMENTS 4,328,579 A * 5/1982 Hashimoto et al. ......... 370/111
4,670,874 A * 6/1987 Sato et al. .................. 370/294
4,670,888 A * 6/1987 Smith, III .................... 375/303
4,674,084 A * 6/1987 Suzuki et al. ............... 370/509
5,444,561 A * 8/1995 Kaminishi .................. 359/158
5,457,473 A * 10/1995 Arai et al. ..................... 345/10
5,479,447 A * 12/1995 Chow et al. ................ 375/260
5,646,771 A * 7/1997 Noda ......................... 359/245
5,701,331 A * 12/1997 Hunt .......................... 375/316
5,742,135 A * 4/1998 Horst ......................... 375/354
5,761,244 A * 6/1998 Hedberg ..................... 375/257
5,767,698 A * 6/1998 Emeigh et al. ............... 326/83
5,826,048 A * 10/1998 Dempsey et al. ........... 710/129
5,841,841 A * 11/1998 Dodds et al. ............ 379/93.08
6,057,812 A * 5/2000 Aria et al. ...................... 345/10

* cited by examiner

*Primary Examiner*—Thomas Lee
*Assistant Examiner*—Chun Cao
(74) *Attorney, Agent, or Firm*—Fitzpatrick, Cella, Harper & Scinto

(57) ABSTRACT

Signals are transmitted through a plurality of transmission channels, each including at least a pair of signal lines for transmitting an interface signal, between a transmitter and a receiver. A predetermined signal is modulated by a modulator with a high-frequency signal, and the modulated signal is provided to a signal line of one of the plurality of transmission channels. A demodulator receives the modulated signal transmitted via this signal line, and demodulates the modulated signal from the signal line based on the frequency of the high-frequency signal. According to the above-described configuration, an interface control method and apparatus which can newly exchange other data and control signals while conforming to existent interface specifications are provided.

8 Claims, 14 Drawing Sheets

INTERFACE CONTROL SYSTEM FOR EXCHANGING SIGNALS BY SUPERPOSING SIGNALS TO AN EXISTED SIGNAL LINE USING LOW VOLTAGE DIFFERENTIAL SIGNAL

BACKGROUND OF THE INVENTION

1. Field of the Invention

The present invention relates to an interface control method and apparatus for exchanging various kinds of signals between apparatuses or between units.

2. Description of the Related Art

FIG. 2 is a diagram illustrating standard interfaces in an ordinary computer, serving as an information processing apparatus. In FIG. 2, reference numeral 201 represents a PCI (peripheral component interconnect) bus, serving as an internal bus as well as a bus for external expansion. Reference numeral 202 represents a line for a network conforming to Ethernet interface specifications. An SCSI (small computer system interface) interface bus 203 is mainly used for transferring large-capacity data from a hard disk, a CD-ROM (compact disk-read-only memory) or the like. An ISA (industry standard architecture) bus 204 serves as a bus for external expansion. An interface bus 205 connects a graphic controller to a CRT (cathode-ray tube) or a flat-type display, such as an FLCD (ferroelectric liquid crystal display) or the like. Currently, analog interfaces are mainly used. However, digital interfaces using LVDS (low voltage differential signaling) or the like have already been manufactured, and standardization for such digital interfaces will be realized in the near future.

The use of such standardized interfaces has the merit that different apparatuses can be connected and operated compatibly even if they are designed and manufactured by different manufacturers.

However, in order to obtain this benefit, an apparatus must be designed and manufactured so as to conform to the standardized use of interfaces. Accordingly, there is no possibility of adopting original specifications without sacrificing the benefit of stadardization. This results in restriction in the degree of freedom in design, and redards the development of new devices.

When constructing an interface conforming to respective interface specifications, and connecting an apparatus which uses a bus structure such that addresses, data, commands and the like are transmitted using individual signal lines, via the interface, it is usually necessary to connect all of the signal lines. For example, in an apparatus which uses buses having capacities of 26 bits for addresses, 16 bits for data, and a plurality of other control signal lines, such as a PC (personal computer) card, the number of signal lines necessary for the interface is 42 just for addresses and data, and is therefore very large. As the number of bits for addresses and data increases in accordance with an increase in the capacity of data stored in memory or the like, an increase in the number of signal lines requires an increase in the size of cables and connectors. This is a serious problem.

SUMMARY OF THE INVENTION

The present invention has been made in consideration of the above-described problems.

It is an object of the present invention to provide an interface control method and apparatus which can newly exchange other data and control signals while conforming to existent interface specifications.

It is another object of the present invention to provide an interface control method and apparatus which can exchange various kinds of signals by superposing a desired signal without influencing existent interface signals.

It is still another object of the present invention to provide an interface control method and apparatus which can reduce the number of used signal lines without reducing the functions of interfaces.

According to one aspect, the present invention which achieves these objectives relates to an interface control apparatus comprising a plurality of transmission channels each including at least a pair of signal lines for transmitting an interface signal, transmission means for transmitting signals via the transmission channels, reception means for receiving the signals so transmitted, modulation means for modulating a desired signal with a high-frequency signal and providing the modulated signal to a signal line of one of the transmission channels, and demodulation means for extracting the modulated signal from that signal line and demodulating the extracted signal.

According to another aspect, the present invention which achieves these objectives relates to an interface control method comprising the steps of modulating a desired signal with a high-frequency signal, supplying the resulting modulated signal to a signal line of one of a plurality of transmission channels each of which includes at least a pair of signal lines for transmitting an interface signal, and extracting the modulated signal from that signal line and demodulating the extracted signal.

According to still another aspect, the present invention which achieves these objectives relates to an interface control apparatus for exchanging signals between a host apparatus and a peripheral apparatus via a plurality of signal lines. The host apparatus comprises address gate means for gating an address signal, and data gate means for controlling a direction of transmission and passage of a data signal whose bits are smaller in number than the bits of the address signal. The peripheral apparatus comprises gate means for inputting the address signal from the host apparatus via a transmission bus having a bus width corresponding to a bus width for the data signal, input gate means for inputting the data signal from the transmission bus, and output gate means for outputting the data signal to the transmission bus. The interface control apparatus comprises control means for outputting a gate control signal for each of the address gate means, the data gate means, the gate means, the input gate means and the output gate means based on a provided access command.

According to yet another aspect, the present invention which achieves these objectives relates to an interface control method for exchanging signals between a host apparatus and a peripheral apparatus via a plurality of signal lines. The method comprises the step of gating an address signal output from the host apparatus by a gate circuit, and inputting/outputting a data signal including bits whose number is smaller than a number of bits of the address signal through a data gate for controlling a direction of transmission and passage of the data gate. The peripheral apparatus inputs the address signal from the host apparatus via a transmission bus having a bus width corresponding to a bus width of the data signal to gate the input address signal and exchanges data with the transmission bus via an input/output gate, outputs a gate control signal for each of the gate circuit, the data gate, and the gate and the input/output gate of the peripheral apparatus based on a provided memory access command, and exchanges the data signal and the address signal via the transmission bus.

The high-frequency signal used for the mentioned modulation should be sufficiently high to avoid influencing nearby circuits, and preferably should be at least 50 to 100 times the frequency of the data signal.

The foregoing and other objects, advantages and features of the present invention will become more fully apparent from the following detailed description of the preferred embodiments taken in conjunction with the accompanying drawings.

DETAILED DESCRIPTION OF THE PREFERRED EMBODIMENTS

Preferred embodiments of the present invention will now be described in detail with reference to the drawings.

First Embodiment

Figure 1:
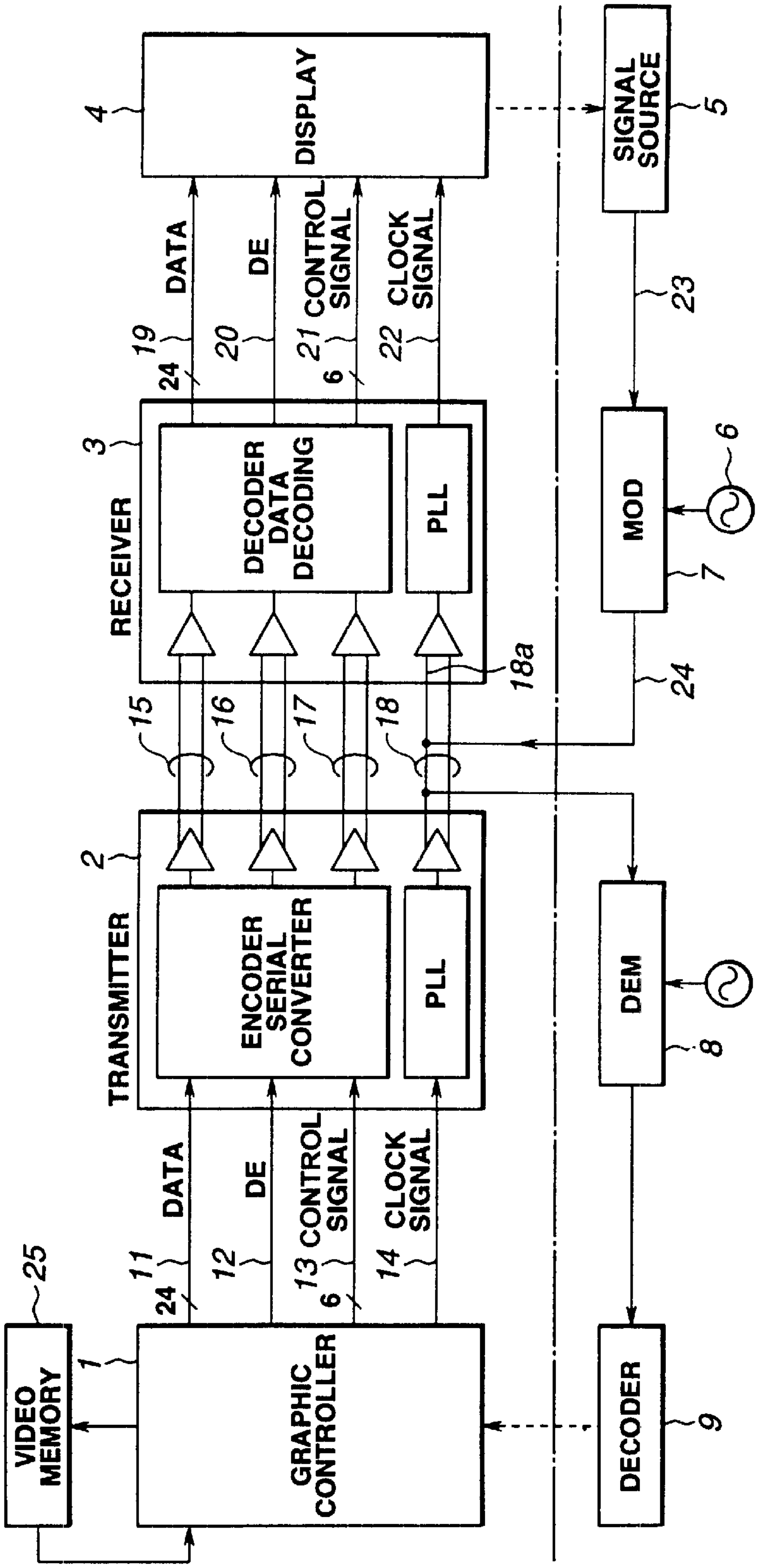
FIG. 1 is a block diagram illustrating the configuration of an interface circuit according to a first embodiment of the present invention.
Figure 2:
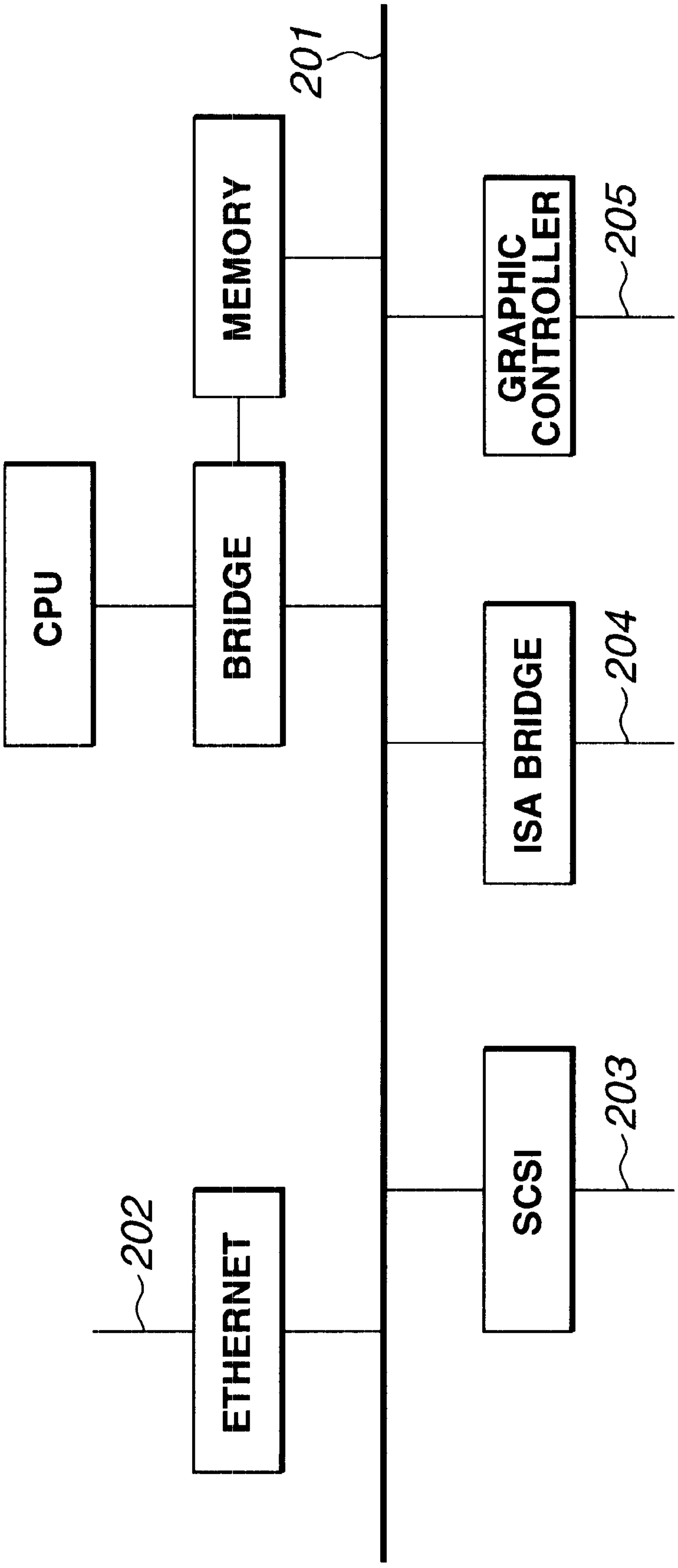
FIG. 2 is a diagram illustrating connection of a various kinds of interfaces in an ordinary information processing apparatus.

FIG. 1 is a block diagram illustrating the configuration of a display control circuit of an information processing apparatus according to a first embodiment of the present invention. Although in each of the following embodiments of the present invention, description is provided illustrating a display control circuit, the present invention is not limited to such a circuit. For example, the present invention may also be applied to well-known interface specification for an interface circuit with a printer, an interface circuit with any kind of communication circuit, or the like.

In FIG. 1, a graphic controller 1 outputs display information from a video memory 25 storing the display information to a display unit sequentially or in the order of instructions from the outside of the apparatus. In the case shown in FIG. 1, the graphic controller 1 outputs a 24-bit data signal 11, a DE (data enable) signal 12, a 6-bit control signal 13, and a clock signal 14. An LVDS transmitter 2 receives the 24-bit data signal 11, the DE signal 12 and the 6-bit control signal 13 output from the graphic controller 1, as inputs, converts each of these input signals into a serial signal, and outputs the respective serial signals to three transmission channels 15, 16 and 17, each including a pair of signal lines, respectively, at a high speed. The clock signal 14 is converted into a low-rate signal, which is output to a transmission channel 18 including a pair of signal lines. A specific example of the LVDS transmitter 2 is a 65100 Panel Link (trade name) Transmitter made by Chips and Technologies Inc.

An LVDS receiver 3 has the function of receiving the above-described signals transmitted from the LVDS transmitter 2 via the three transmission channels 15–17 (each including a pair of signal lines) and the transmission channel 18 for transmitting the low-rate clock signal, and restoring the received signals into a 24-bit data signal 19, a DE signal 20, a 6-bit control signal 21, and a clock signal 22, which equal the respective original signals, and outputting the obtained signals. A specific example of the LVDS receiver is a 65101 Panel Link (trade name) Receiver made by Chips and Technologies Inc.

Reference numeral 4 represents a flat-panel display such as an FLCD or the like, which may adopt any display method, provided that it can perform display in response to an output from the graphic controller 1.

The above-described configuration is adopted when performing ordinary LVDS transfer.

A signal source 5 generates a signal which is to be transmitted from the flat-panel display 4 to the graphic controller 1, such as a data transfer request signal 23. A high-frequency oscillator 6 outputs, for example, a signal having a frequency of 900 MHz. The frequency of the high-frequency signal is desirably at least 50–100 times the frequency of the signal to be transmitted. A modulator (MOD) 7 modulates the carrier for the high-frequency signal from the high-frequency oscillator 6 based on the data transfer request signal 23 from the signal source 5. A high-frequency signal 24 thus modulated enters a signal line 18*a* of the transmission channel 18 for the clock signal at the reception side (connected to the LVDS receiver 3) of the transmission channel 18, and is transmitted to the transmission side (connected to the LVDS transmitter 2) via the signal line 18*a*. Since the high-frequency signal 24 is modulated with a high frequency of 900 MHz, it does not influence the circuits of the LVDS receiver 3 and the LVDS transmitter 2.

A demodulator (DEM) 8 is connected to the signal line 18*a* at the transmission side (connected to the LVDS transmitter 2) of the transmission channel 18 for the clock signal. The demodulator 8 includes, for example, a high-pass filter or a band-pass filter capable of passing a signal of a 900-MHz band, and extracts and demodulates the modulated high-frequency signal 24 output from the modulator 7 and transmitted via the signal line 18*a*. A decoder 9 decodes the data transfer request signal demodulated by and output from the demodulator 8, and transmits the contents of the signal to the graphic controller 1 or a peripheral circuit thereof. As described above, the graphic controller 1 transmits the data signal and the like based on the data transfer request signal.

As described above, according to the first embodiment, by superposing a high-frequency modulated signal on a low-rate clock signal and transmitting the resultant signal between the receiver and the transmitter, a desired signal can be transmitted/received without influencing the operations of the receiver and the transmitter. Although in the first embodiment, a description has been provided illustrating a data transfer request signal, for example, information relating to the temperature, the mode, the type or the like of the flat-panel display 4 may be transferred.

Second Embodiment

Figure 3:
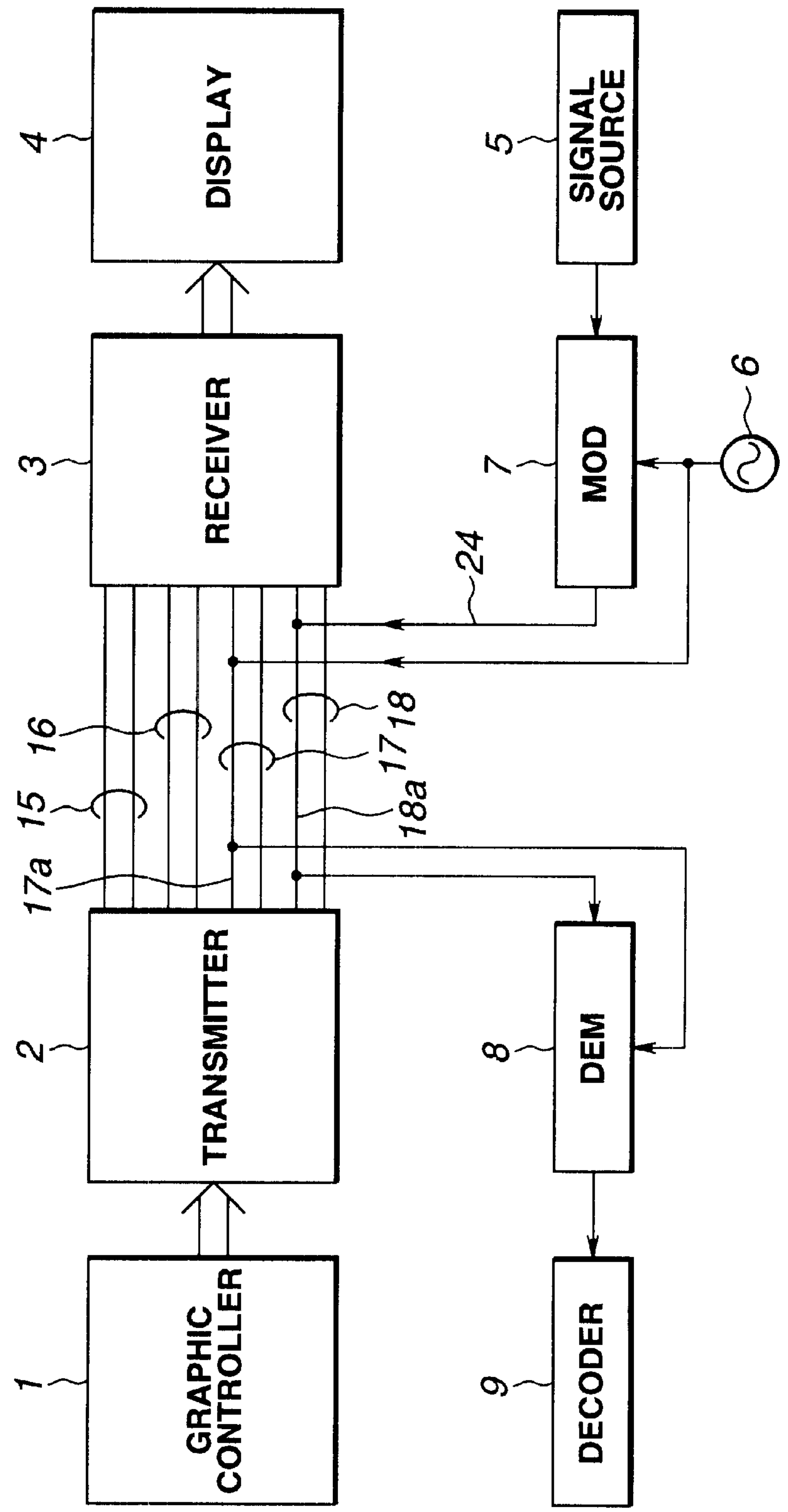
FIG. 3 is a block diagram illustrating the configuration of an interface circuit according to a second embodiment of the present invention.

FIG. 3 is a block diagram illustrating the configuration of a display control circuit in an information processing apparatus according to a second embodiment of the present invention. In FIG. 3, the same portions as those shown in FIG. 1 are indicated by the same reference numerals, and further description thereof will be omitted.

In the configuration shown in FIG. 3, a 900-MHz high-frequency signal output from a high-frequency oscillator 6 enters the reception side of a signal line 17*a* of one of several transmission channels (other than a transmission channel 18 where a modulated signal 24 output from a modulator (MOD) 7 enters) as in the case of the high-frequency signal 24 in the first embodiment, and is transmitted to the transmission side (connected to a transmitter 2) via the signal line 17*a* of the transmission channel 17. In this case, also, as in the above-described case of the high-frequency signal 24, since the frequency of the high-frequency signal has a very large value (900 MHz), the high-frequency signal does not influence the circuits of a receiver 3 and the transmitter 2. The high-frequency signal extracted from the signal line 17*a* of the transmission channel 17 at the transmission side (connected to the transmitter 3) is demodulated by a demodulator 8.

As described above, according to the second embodiment, since both a modulated high-frequency signal and a high-frequency signal used for modulation are transmitted, it is possible to omit a high-frequency signal source for demodulation in the demodulator for receiving the modulated signal and demodulating the received signal, and so to obtain a higher accuracy in demodulation.

Third Embodiment

Figure 4:
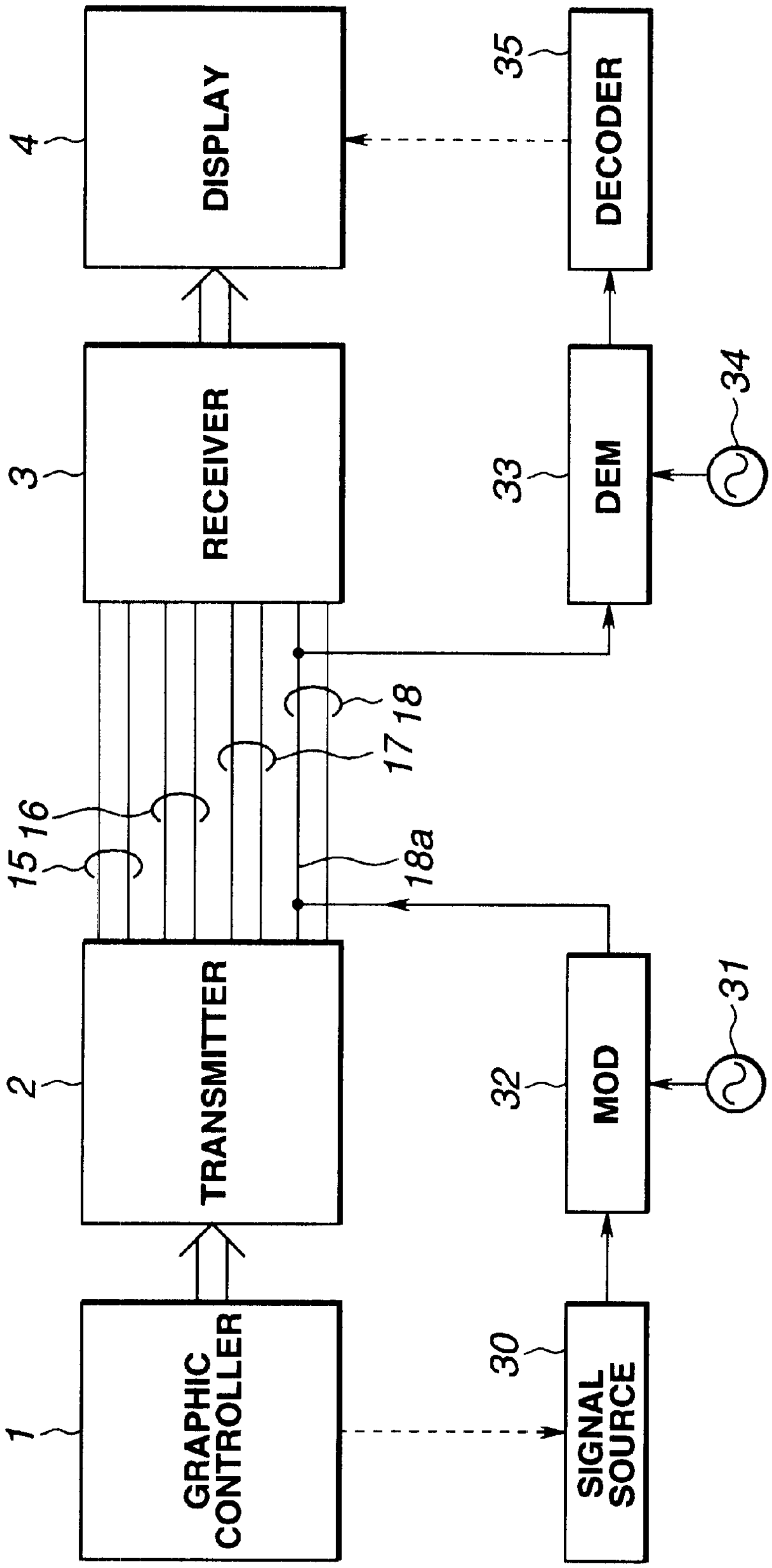
FIG. 4 is a block diagram illustrating the configuration of an interface circuit according to a third embodiment of the present invention.

FIG. 4 is a block diagram illustrating the configuration of a display control circuit of an information processing apparatus according to a third embodiment of the present invention. In FIG. 4, the same portions as those in FIG. 3 are indicated by the same reference numerals, and further description thereof will be omitted.

In the third embodiment, in contrast to the above-described first and second embodiments, modulated data is transmitted from a graphic controller 1 to a flat-panel display 4. Reference numeral 30 represents a source for generating a signal to be transmitted from the graphic controller 1 to the flat-panel display 4. In the case shown in FIG. 4, the signal source 30 generates, for example, a sleeve signal. A high-frequency oscillator 31 outputs, for example, a 900-MHz high-frequency signal. A modulator (MOD) 32 modulates the carrier of the high-frequency signal output from the high-frequency oscillator 31 with the sleeve signal output from the signal source 30. The signal thus modulated by the modulator 32 enters a signal line 18*a* of a transmission channel 18 for a clock signal at the transmission side (connected to a transmitter 2) of the transmission channel 18, and is transmitted to the reception side (connected to a receiver 3) via the signal line 18*a*. Again, since the modulated signal has a high frequency (900 MHz), it does not influence the circuits of the transmitter 2 and the receiver 3.

A demodulator (DEM) 33 is connected to the reception side (connected to the receiver 3) of the transmission channel 18 for the clock signal. The demodulator 33 includes a high-pass filter or a band-pass filter capable of passing, for example, only a 900-MHZ-band signal from the signal line 18*a* of the trasmission channel 18, and demodulates only the modulated signal output from the modulator 32. A high-frequency oscillator 34 generates a 900-MHZ high-frequency signal to be used for demodulation by a demodulator 33, as the high-frequency oscillator 31. If the signal output from the high-frequency oscillator 31 is transmitted to the demodulator 33 utilizing another transmission channel as in the second embodiment, the high-frequency oscillator 31 can be omitted. A decoder 35 decodes a sleeve signal output from the demodulator 33, and transmits the decoded signal to the flat-panel display 4 or a peripheral circuit thereof.

By thus transmitting the sleeve signal to the flat-panel display 4, the flat-panel display 4 shifts to a sleeve mode, in which power consumption is reduced.

As described above, according to the first through third embodiments, even in a transmission line for standardized interfaces, it is possible to uniquely provide a desired signal, and to transmit a desired data signal without influencing other signals.

As a result, compatibility between interfaces is not impaired.

The above-described embodiments can be applied whether signals specified by interfaces are serial or parallel.

Fourth Embodiment

Figure 5:
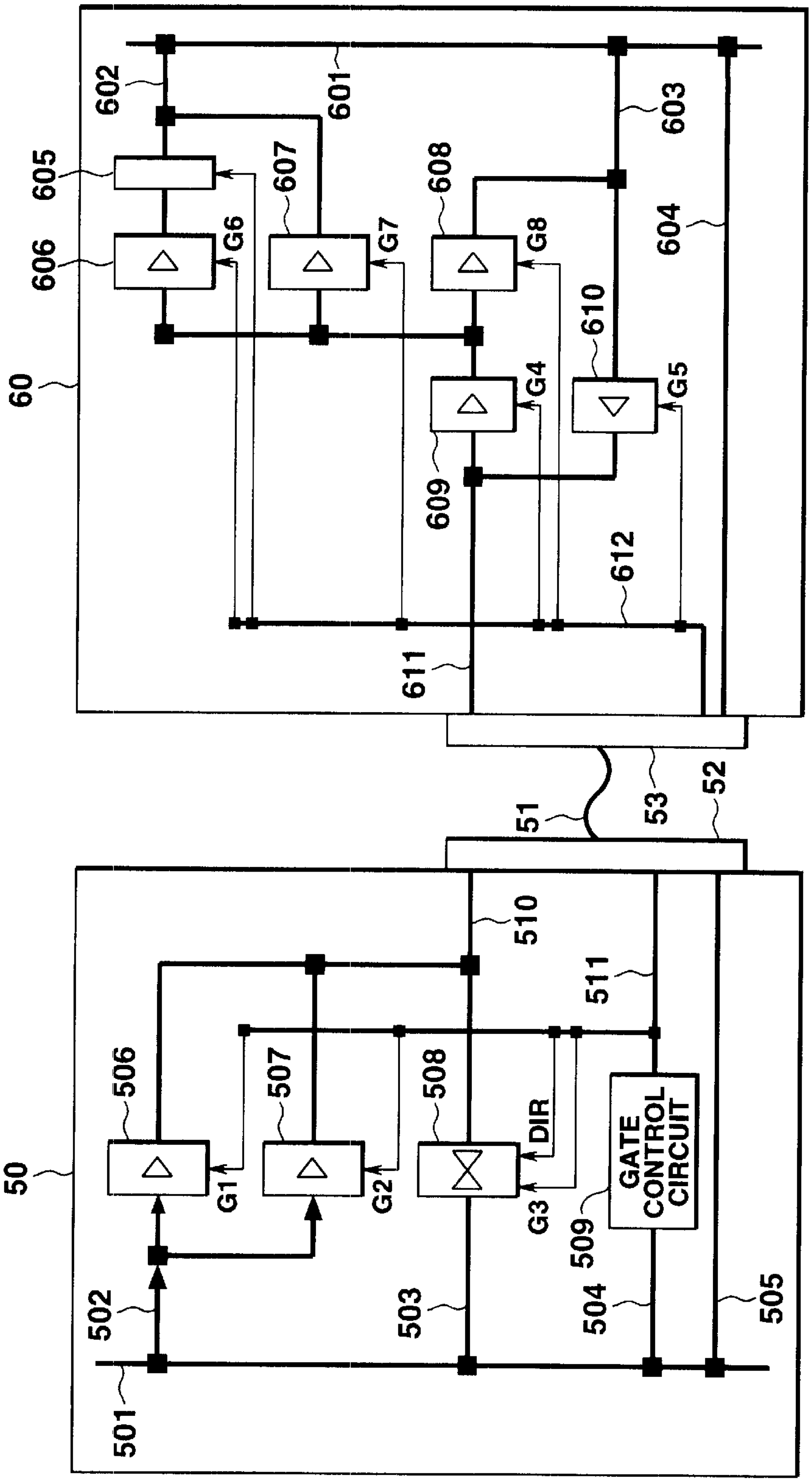
FIG. 5 is a block diagram illustrating the configuration of an interface circuit according to a fourth embodiment of the present invention.

FIG. 5 is a block diagram illustrating interfaces between a host apparatus and a peripheral apparatus in an information processing apparatus according to a fourth embodiment of the present invention.

In FIG. 5, reference numeral 50 represents an input/output unit of the host apparatus. There are also shown an internal bus 501 of the input/output unit 50 of the host apparatus, and an address signal line 502 connected to the internal bus 501. Upper addresses and lower addresses on the address signal line 502 enter an upper-address gate circuit 506 and a lower-address gate circuit 507, respectively. A data signal line 503 is connected to the internal bus 501 and to a data gate circuit 508. A control signal line 504 and a command signal line 505 are connected to the internal bus 501. An address data signal line 510 is connected to the upper-address gate circuit 506, the lower-address gate circuit 507 and the data gate circuit 508, and serves as a bus where addresses and data are transmitted. A gate control circuit 509 controls the respective gate circuits in accordance with the contents of a signal on the internal bus 501, and outputs gate control signals G1, G2 and G3, and a direction control signal DIR. A control signal line 511 is connected to the gate control circuit 509, and transmits gate control signals for controlling the upper-address gate circuit 506 and the lower-address gate circuit 507 and the data gate circuit 508, a direction control signal and the like.

Next, a description will be provided of an input/output unit 60 of the peripheral apparatus connected to the input/output unit 50 of the host apparatus via connectors 52 and 53, and a cable 51.

The input/output unit 60 of the peripheral apparatus is connected to the input/output unit 50 of the host apparatus via the cable 51. Reference numeral 601 represents an internal bus of the input/output unit 60 of the peripheral apparatus. An address signal line 602 is connected to the internal bus 601. Upper addresses on the address signal line 602 enter an upper-address gate latch circuit 606. Lower addresses on the address signal line 602 enter a lower-address gate latch circuit 607. A data signal line 603 is connected to the internal bus 601. The output side of the data signal line 603 is connected to an output gate circuit 610. The input side of the data signal line 603 is connected to an input gate circuit 608. Input lines to the upper-address gate latch circuit 606, the lower-address gate latch circuit 607 and the input gate circuit 608 are connected to an input gate circuit 609. An address data line 611 connects the cable 51 to the output gate circuit 610 and the input gate circuit 609. Addresses and data input through the address data line 611 are taken in by a gate control signal G4. An address is taken in at the timing of a gate control signal G6 or G7, and data is taken in at the timing of a gate control signal G8. A command line 604 connects the cable 51 to the internal bus 601. A control signal line 612 transmits signals output from the gate control circuit 509 via the control signal line 511 of the input/output unit 50 of the host apparatus and the cable 51 in order to control the upper-address gate latch circuit 606, the lower-address gate latch circuit 607, the output gate circuit 610, and the input gate circuits 608 and 609.

In interfaces comprising the above-described units, interface control between the input/output unit 50 of the host apparatus and the input/output unit 60 of the peripheral apparatus will now be described.

First, the internal bus 501 of the input/output unit 50 of the host apparatus corresponds to a bus of a PC card (conforming to PCMCIA (Personal Computer Memory Card International Association)), and transmits 26-bit addresses, 16-bit data, and command signals, such as OE (output enable)*, WE (write enable)*, IORD (I/O read)*, IOWR (I/O write)*, CE (chip enable)*, CE*, IRQ (interrupt request)*, RESET, WAIT*, INPACK*, REG*, IOIS16*, and the like, where * represents a low-true (negative logic) signal. In order to allow exchange of signals between the host apparatus and the peripheral apparatus while reducing the number of signal lines, the following processing is performed.

Figure 6A:
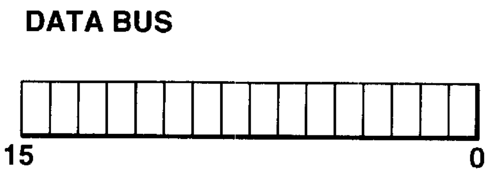
FIGS. 6(A) through 6(C) are diagrams illustrating the data configuration of data and address signals in the fourth embodiment.
Figure 6B:
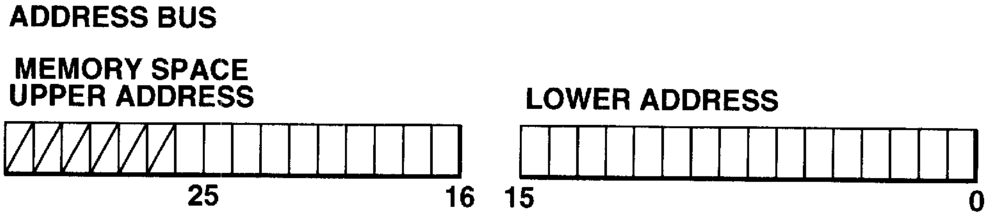
Figure 6C:
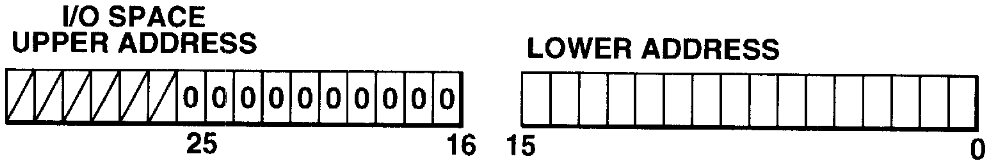

The address signal line 510 is a signal line having a width of 16 bits connected to the input gate circuit 609 via the cable 51. FIGS. 6(A) through 6(C) illustrate the arrangement of bits for addresses and data at that time. The command signal lines 505 and 604 are connected to each other via the cable 51, and have a width of 8 bits for output and 4 bits for input.

FIG. 6(A) illustrates the data structure of the data signal line 503, which comprises 16 bits. FIG. 6(B) illustrates the data structure of the address signal line 502, which comprises 16 bits for lower addresses, and 10 bits for upper addresses (from the 16th bit to the 25th bit). FIG. 6(C) illustrates an I/O address space, in which all lower 16 bits and upper 10 bits (from the 16th bit to the 25th bit) comprise "0".

A description will now be provided of various kinds of control signals generated by the gate control circuit 509.

G1: A gate signal for the upper-address gate circuit 506.

G2: A gate signal for the lower-address gate circuit 507.

G3: A gate signal for the data gate circuit 508.

DIR: A direction signal for the data gate circuit 508 (input as seen from the host apparatus side with a low level, and output with a high level).

The following signals having a width of 5 bits which are to be used by the input/output unit 60 of the peripheral apparatus are output to the control signal line 612 connected via the cable 51.

G4: A gate signal for the input gate circuit 609.

G5: A gate signal for the output gate circuit 610.

G6: A gate latch signal for the upper-address gate latch circuit 606 (on with a low level, and latch with a a high level).

G7: A gate latch signal for the lower-address gate latch circuit 607 (on with a low level, and latch with a high level).

G8: A gate signal for the input gate circuit 608.

(All gate signals except the signals G6 and G7 are assumed to be on with a low level, and to have a high impedance with a high level).

Figure 7:
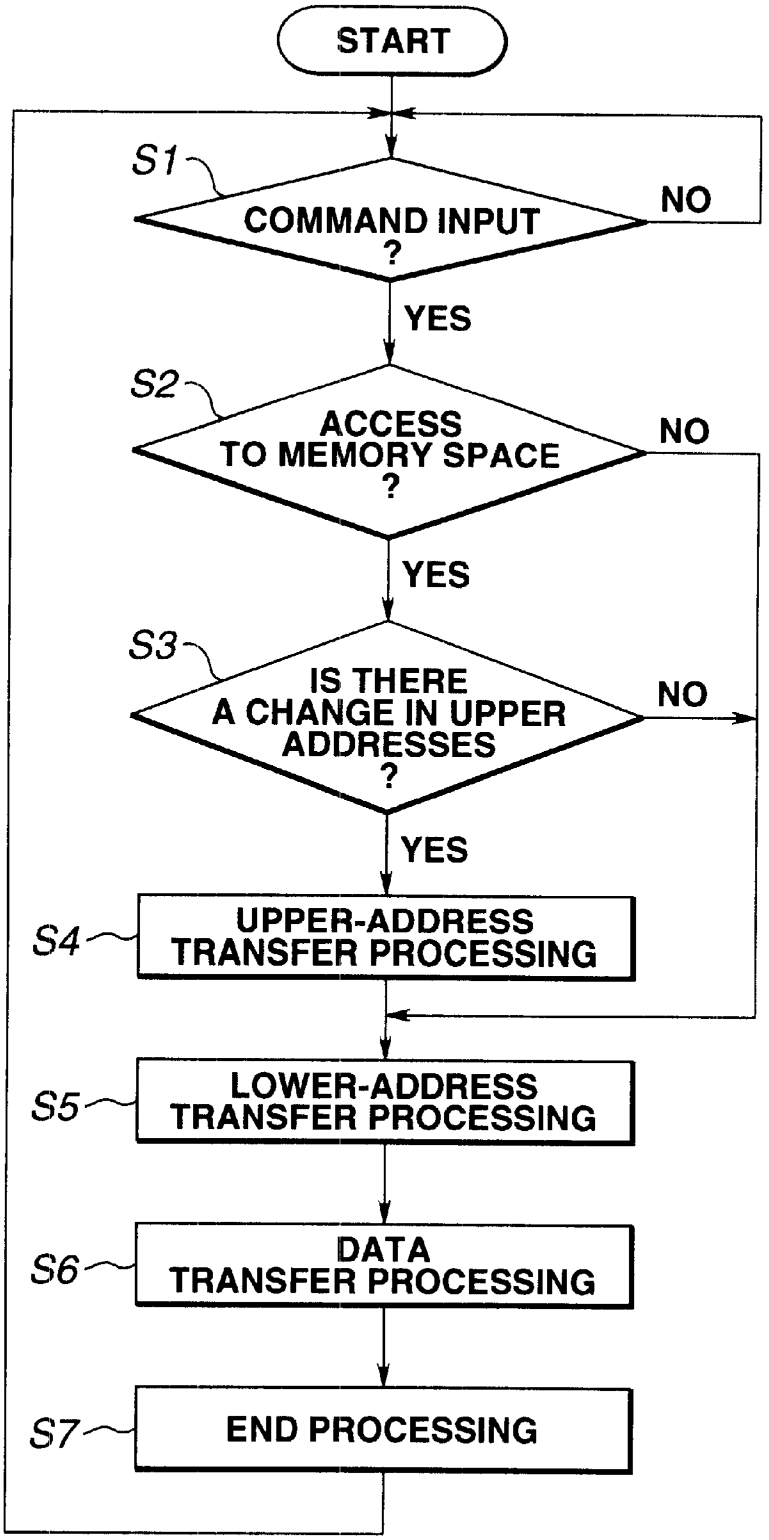
FIG. 7 is a flowchart illustrating the processing of a gate control circuit of the interface circuit of the fourth embodiment.

FIG. 7 is a flowchart illustrating the interface control processing by the gate control circuit 509 of the fourth embodiment. Processes in respective processing steps will now be specifically described.

First, in step S1, it is determined if an input/output command has been input. If the result of the determination in step S1 is affirmative, the process proceeds to step S2, where it is determined if the input/output indicates an access to a memory space (not an I/O address space). If the result of the determination in step S2 is negative, i.e., if the input/output indicates an access to the I/O address space, the process proceeds to step S5, where only lower addresses (16 bits) are transferred.

If the result of the determination in step S2 is affirmative, the process proceeds to step S3, where it is determined if there is an change in upper addresses. If the result of the determination in step S3 is affirmative, the process proceeds to step S4, where the changed upper address is transmitted. If the result of the determination in step S3 is negative, the process proceeds to step S5, where only lower addresses are transmitted.

When addresses have thus been fixed, the process proceeds to step S6, where data transfer processing is executed by controlling gates so as to output data to the data signal line. Upon completion of the instructed data transfer, the process proceeds to step S7, where end processing comprising closing of gates, and the like is executed, and the process returns to step S1.

Figure 8:
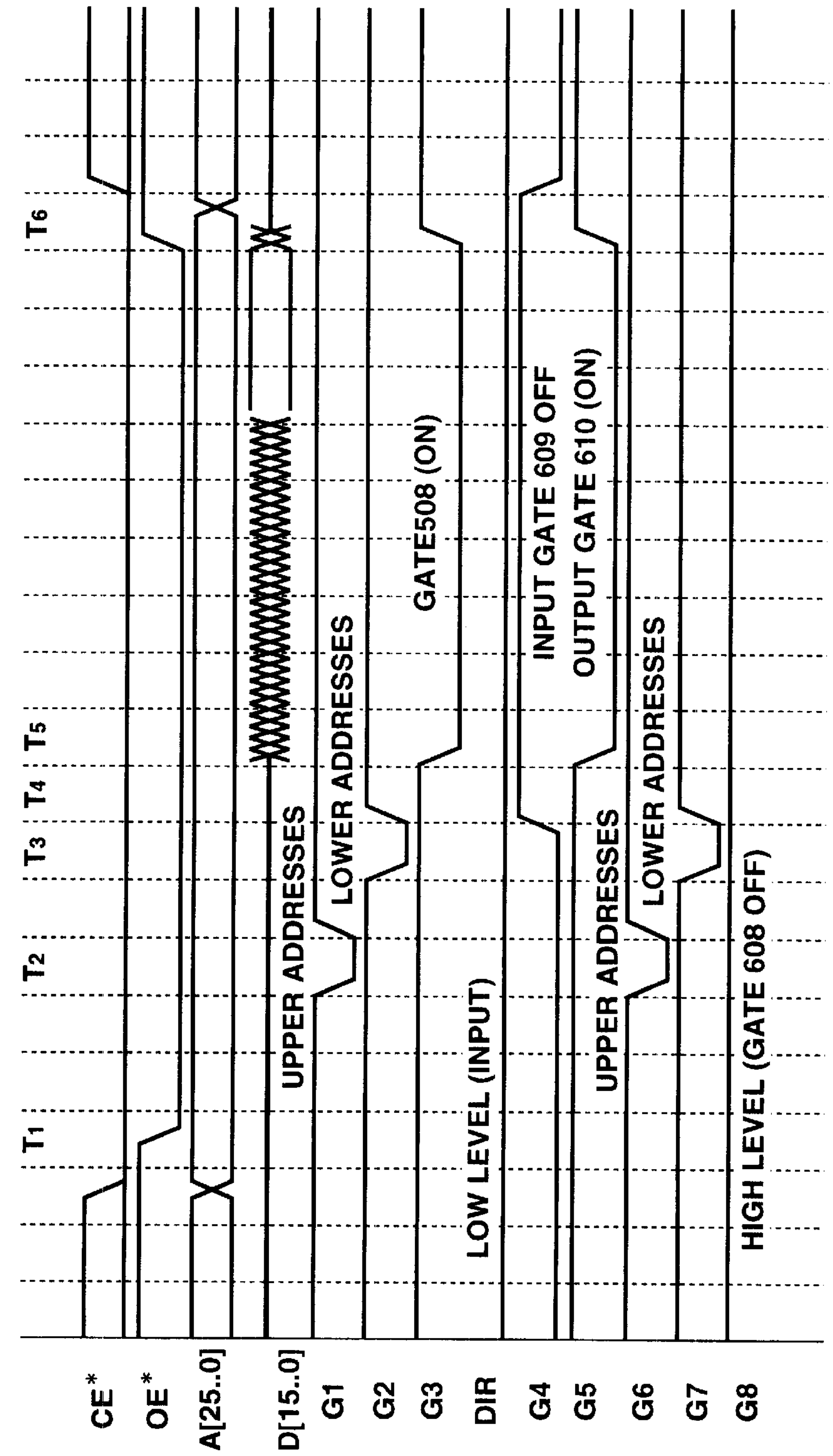
FIG. 8 is a timing chart illustrating the processing of the gate control circuit of the interface circuit of the fourth embodiment.

FIG. 8 is a diagram illustrating a timing chart for output signals of the gate control circuit 509 when the output (read) enable signal OE* indicating reading processing in the memory space is asserted on the control signal line 504. The operation of the gate control circuit 509 will now be described with reference to the flowchart shown in FIG. 7.

First, in step S1, when no command is asserted on the command signal line 504, the gate control circuit 509 causes the gate control signal G4 for the input gate circuit 609 and the direction control signal DIR for the data gate circuit 508 to assume a low level, and causes gate control signals for all the remaining gate circuits to assume a high level, and continues to await an input.

In step S2, when the output enable signal OE* has been asserted on the command signal line 504 (at a timing T1 shown in FIG. 8), the gate control circuit 509 determines that an access to the memory space has been performed. In step S3, the output enable signal OE* is asserted on the command signal line 504, and addresses are output to the address signal line 502. The gate control circuit 509 compares current upper addresses with preceding upper addresses to determine if there is a change in the upper addresses. If there is a change, the process proceeds to step S4, where processing for transferring the upper addresses is performed (at a timing T2 shown in FIG. 8).

At that time, in order to fix the upper addresses, the gate control circuit 509 causes the gate control signal G1 of the upper-address gate circuit 506 and the gate control signal G6 of the upper-address gate latch circuit 606 to assume a low level (T2) until the upper addresses can be fixed on the address signal line 602, and then causes these signals to assume a high level, and the upper-address gate latch circuit 606 continues to hold the upper addresses.

If there is no change in the upper addresses, the gate control circuit 509 holds the gate control signals G1 and G6 at a high level.

When access is not being made to the memory space, the values of the upper addresses are masked with "0".

In step S5, in order to fix the lower addresses, the gate control circuit 509 causes the gate control signal G2 of the lower-address gate circuit 507 and the gate control signal G7 of the lower-address gate latch circuit 607 to assume a low level (T3) until the lower addresses are fixed on the address signal line 602, and then causes these signals to assume a high level to cause the lower-address gate latch circuit 607 to hold the lower addresses.

In step S6, for a reading operation, the gate control circuit 509 causes the gate control signal G4 of the input gate circuit 609 to assume a high level (at a timing T4 in FIG. 8). Then, in order to cause the input/output unit 60 of the peripheral apparatus to output data to the host apparatus side, the gate control circuit 509 causes the gate control signal G3 for the data gate circuit 508 and the gate control signal G5 for the output gate circuit 610 of the input/output unit 60 of the peripheral apparatus to assume a low level, to output data on the data line 603 to the data signal line 503 via the gate circuit 610, the cable 51 and the gate circuit 508.

In step S7, the gate control signal G3 of the data gate circuit 508 and the gate control signal G5 of the data output circuit 610 are made to assume a high level (at a timing T6) by deasserting the command, and the next command is awaited.

Figure 9A:
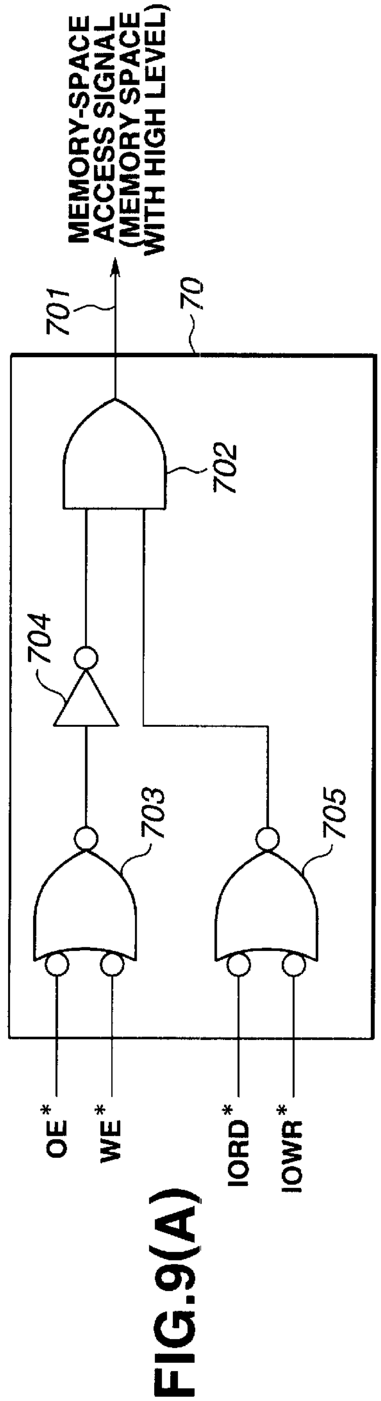
FIGS. 9(A) and 9(B) are block diagrams illustrating the configurations of an address-space identification circuit and an upper-address masking circuit, respectively, in the interface circuit of the fourth embodiment.
Figure 9B:
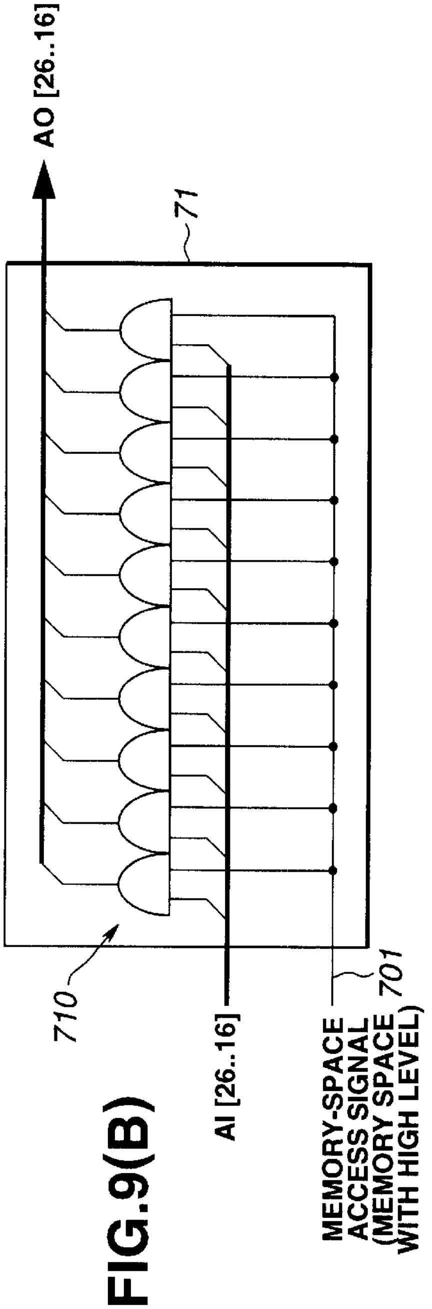

FIGS. 9(A) and 9(B) are diagrams illustrating the configurations of an address-space identification circuit 70 for performing determination of access to the memory space in step S2 shown in FIG. 7, and an upper-address masking circuit 71, respectively.

In order to access the memory space, the output enable signal OE* and the write enable signal WE* are asserted. The output of an AND circuit 703 thereby assumes a low level and is inverted by an inverter circuit 704, so that one input to an AND circuit 702 assumes a high level. The output of an AND circuit 705 assumes a high level only in cases other than read/write to the I/O. Accordingly, only when the signal OE* or the signal WE* is assereted, and in cases other than read/write to the I/O, the output of the AND circuit 702 assumes a high level, and a memory access signal 701 indicating access to the memory space is output. This access signal 701 is also used for masking upper addresses when accessing the I/O space in the circuit shown in FIG. 9(B).

The upper-address masking circuit 71 shown in FIG. 9(B) opens a group of AND circuits 710 when the memory access signal 701 assumes a high level, and closes these circuits in other cases. All of upper bits (bit 16–bit 26) of the address signal are thereby masked to "0" in cases other than access to the memory space.

Figure 10:
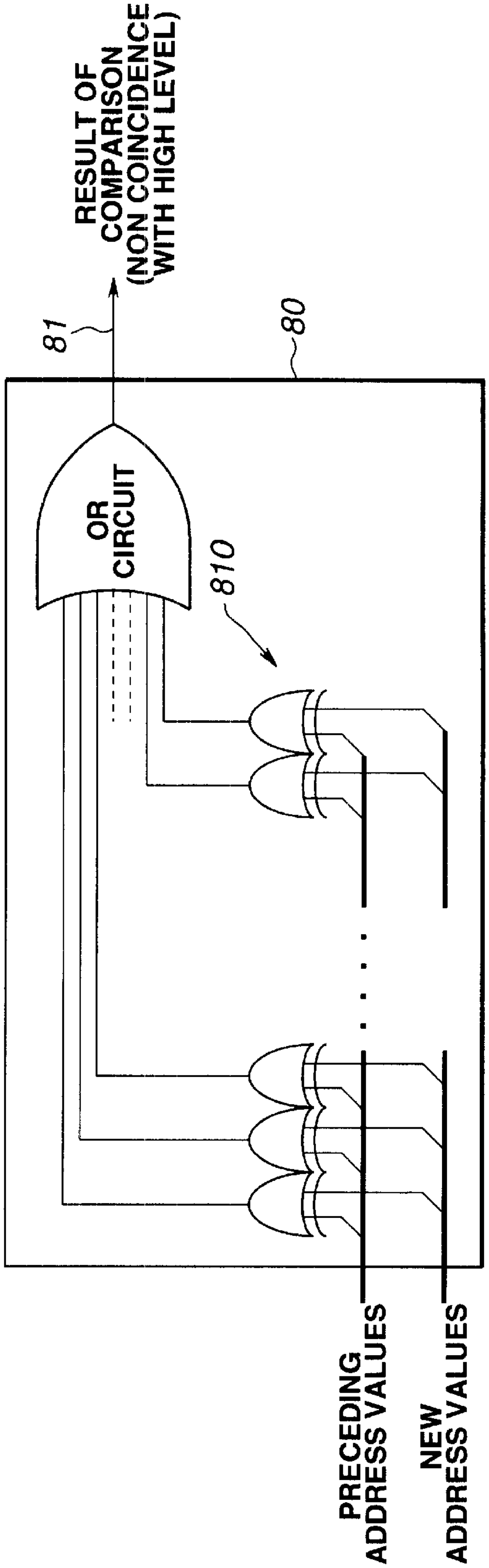
FIG. 10 is a block diagram illustrating the configuration of an address comparison circuit in the interface circuit of the fourth embodiment.

FIG. 10 is a block diagram illustrating the configuration of an address comparison circuit 80 for performing address comparison processing for comparing if there is a change in upper addresses in step S3 shown in FIG. 7.

In this circuit, preceding address values are compared with current address values by a group of exclusive OR circuits 810. If these values coincide with one another (i.e., if all of outputs of the group of exclusive OR circuits 810 assume a low level), a low-level comparison-result signal 81 is output. If these values do not coincide with one another, a high-level comparison-result signal 81 is output.

Figure 11:
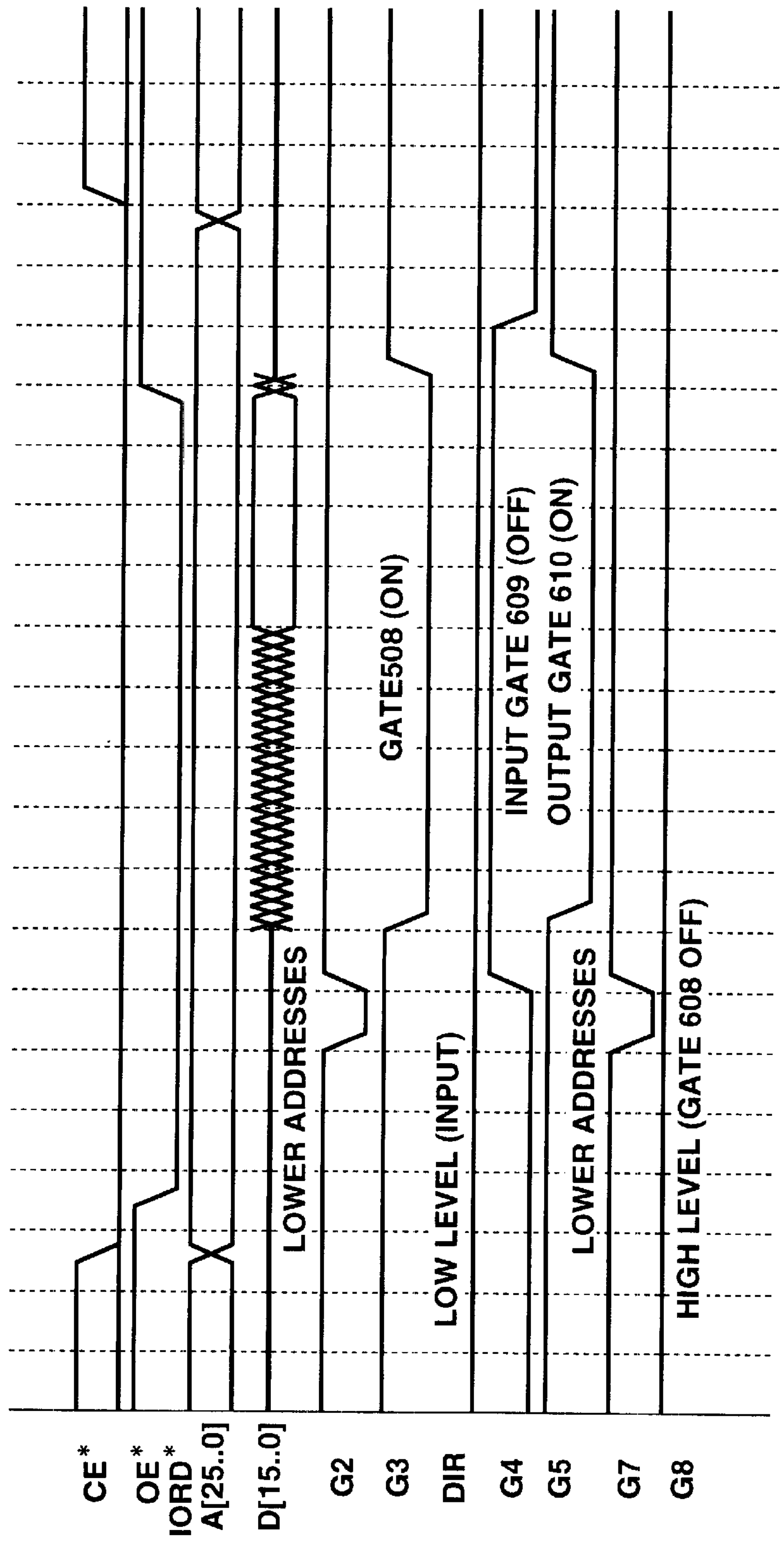
FIG. 11 is a timing chart illustrating processing when upper addresses coincide in the gate control circuit of the interface circuit of the fourth embodiment.

FIG. 11 is a timing chart illustrating the operation reading from the memory space when there is no change in the upper addresses.

As is apparent by comparing this timing chart with the timing chart shown in FIG. 8, the timing of outputting upper addresses according to the gate control signals G1 and G6 is omitted from FIG. 11, and only the lower addresses are output.

Figure 12:
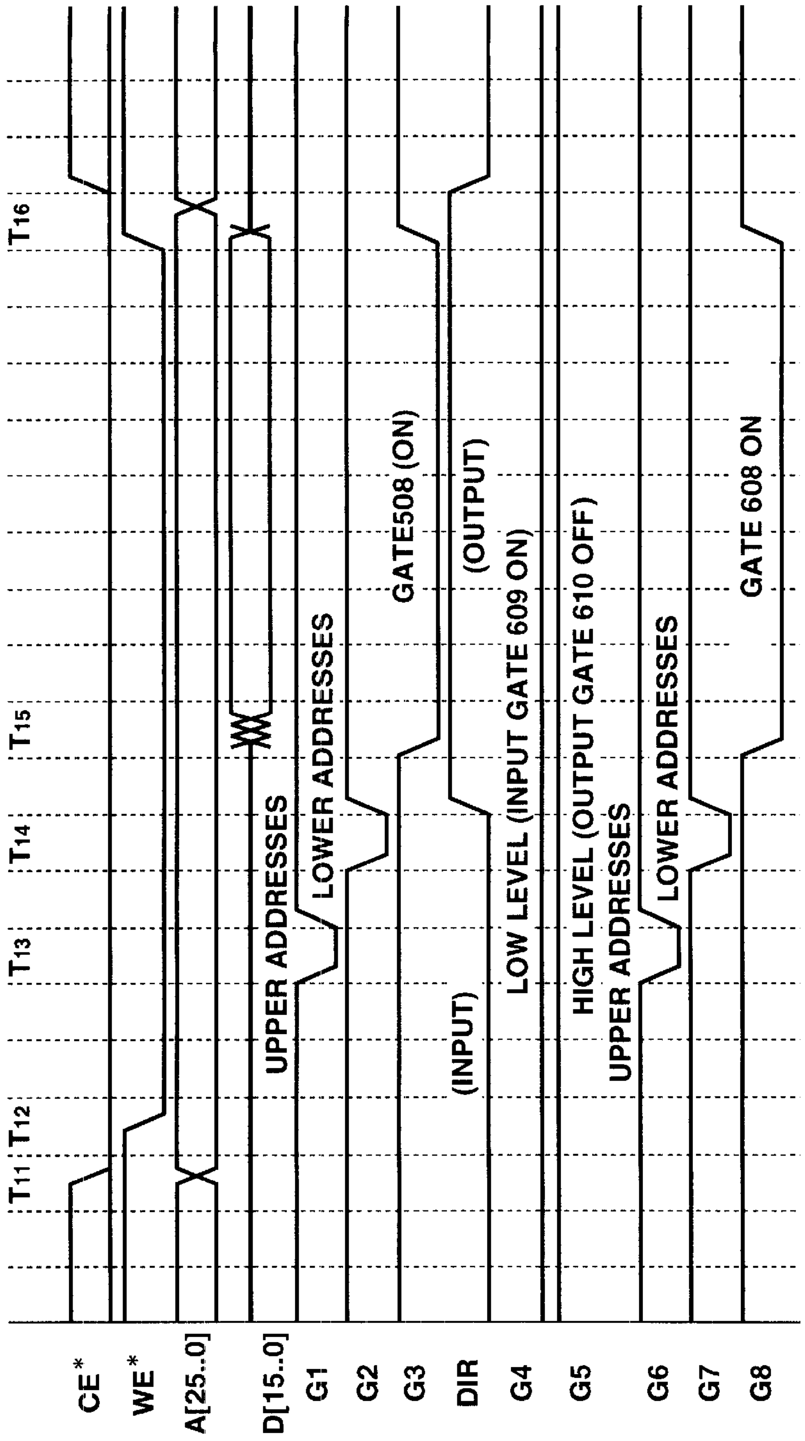
FIG. 12 is a timing chart illustrating writing processing in the gate control circuit of the interface circuit of the fourth embodiment.

FIG. 12 is a timing chart illustrating timings in a writing operation for the memory space (output from the host apparatus to the peripheral apparatus).

First, when no command is asserted on the command signal line 504, the gate control circuit 509 causes the gate control signal G4 for the input gate circuit 609 and the direction control signal DIR for the data gate circuit 508 to assume a low level, and causes the gate control signals for all the remaining gate circuits to assume a high level, and continues to await an input. Assertion of the chip enable signal CE* on the command signal line 504 (at a timing T11 shown in FIG. 12) followed by assertion of the write enable signal WE* (T12) is determined to indicate a write request to the memory space. When the write enable signal WE* is asserted on the command signal line 504, addresses are output to the address signal line 502. The gate control circuit 509 determines if there is a change in the upper addresses by comparing the current upper addresses with preceding upper addresses. If there is a change, upper-address transfer processing is performed (at a timing T13 in FIG. 12). FIG. 12 illustrates a case when there is a change in upper addresses. When there is no change in upper addresses, the output of upper addresses is omitted, as shown in FIG. 11.

At that time, in order to fix the upper addresses, the gate control circuit 509 causes the gate control signal G1 for the upper-address gate circuit 506 and the gate control signal G6 for the upper-address gate latch circuit 506 to assume a low level (T13) until upper addresses are fixed on the address signal line 602. Then, these signals assume a high level, and the upper-address gate latch circuit 606 continues to hold the upper addresses.

If there is no change in the upper addresses, the gate control circuit 509 holds the gate control signals G1 and G6 at a high level, as described above.

If access is not made to the memory space, the values of the upper addresses are masked with "0".

Then, in order to fix the lower addresses, the gate control circuit 509 causes the gate control signal G2 for the lower-address gate circuit 507 and the gate control signal G7 for the lower-address gate latch circuit 607 to assume a low level (T14) until the lower addresses are fixed on the address signal line 602, and then causes these signals to assume a high level to cause the lower-address gate latch circuit 607 to hold the lower addresses, Then, for a writing operation, the gate control circuit 509 causes the gate control signal G5 to assume a high level while maintaining the gate control signal G4 for the input gate circuit 609 of the input/output unit 60 of the peripheral apparatus at a low level (in an on-state), to cause the output gate circuit 610 to be in an off-state. Then, the gate control circuit 509 causes the direction control signal DIR for the data gate circuit 508 to assume a high level (the direction of output) (after a timing T14). Then, the gate control circuit 509 causes the gate control signal G3 to assume a low level, to cause the data gate circuit 508 in an on-state, to output data on the data signal line 503 to the data address signal line 510 (T15). Simultaneously, the gate control circuit 509 causes the gate control circuit G8 to assume a low level (at a timing T16), and to output data on the address data signal line 611 to the data signal line 603 at the peripheral apparatus side.

By performing the above-described processing, it is possible to exchange data while reducing the number of signal lines of the cable 51, and to mitigate a decrease in the communication speed.

Fifth Embodiment

The basic operation of an interface circuit according to a fifth embodiment of the present invention is substantially the same as in the fourth embodiment, except that an incrementing circuit is provided between the upper-address gate latch circuit 606 and the lower-address gate latch circuit 607, and the address signal line 602 of the input/output unit 60 of the peripheral apparatus.

Figure 13:
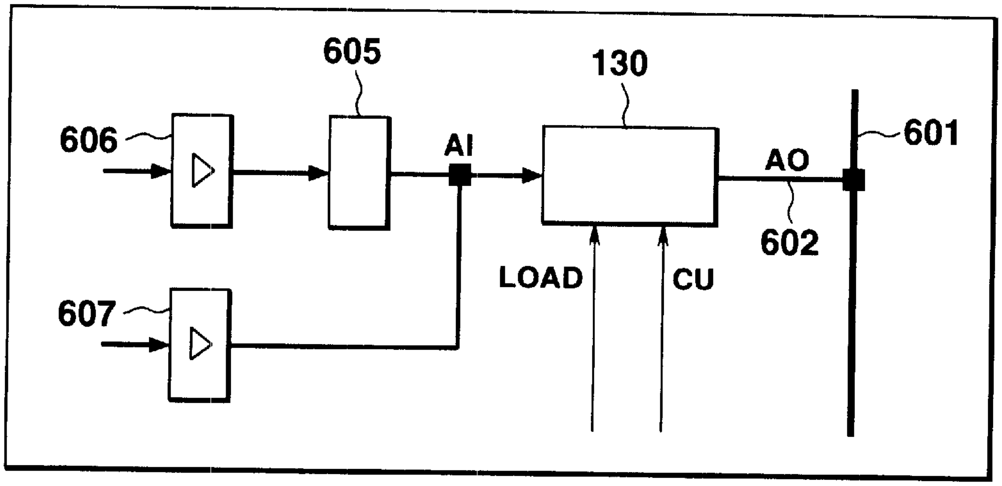
FIG. 13 is a block diagram illustrating the configuration of a lower-address updating (incrementing) circuit when upper addresses coincide.
Figure 14:
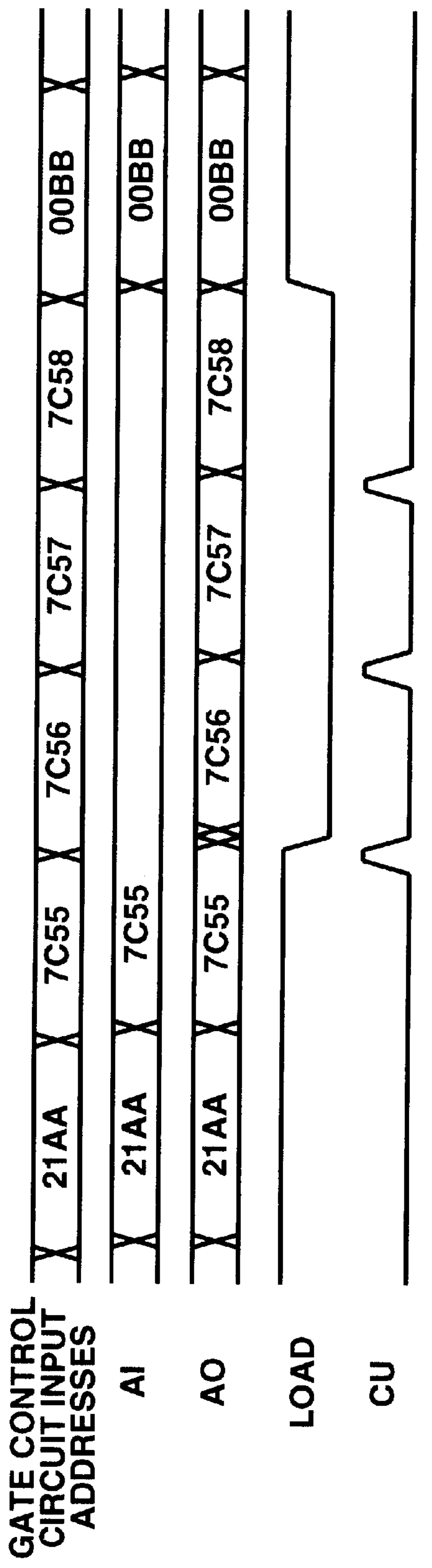
FIG. 14 is a timing chart illustrating the operation of the circuit shown in FIG. 13.

FIG. 13 is a block diagram illustrating the configuration of the incremeting circuit according to the fifth embodiment. FIG. 14 is a timing chart illustrating the operation of the incrementing circuit.

A change in the lower addresses is monitored by inputting the lower addresses in the gate control circuit 509. Usually, when a LOAD signal assumes a high level, input addresses are output without being modified. However, when there is no change in the upper addresses and the lower addresses continuously change, the LOAD signal is made to assume a low level while maintaining the gate control signals G1, G2, G6 and G7 at a high level, and a CU (counting-up) signal is made to assume a high level at a timing where the lower addresses continuously change. The count value (address) of an incrementer 130 shown in FIG. 13 is incremented with the falling edge of the CU signal, and the resultant value is output as an output address.

As described above, according to the fifth embodiment, since data can be input/output by automatically incrementing an address, data transfer by DMA (direct memory access) can be realized.

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may, of course, also be achieved by supplying a system of an apparatus with a storage medium storing program codes of software for realizing the functions of the above-described embodiments, and reading and executing the program codes stored in the storage medium by means of computer (or a CPU or an MPU (microprocessor unit)) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD-ROM, a CD-R (recordable), a magnetic tape, a nonvolatile memory card, a ROM or the like may be used as the storage medium for supplying the program codes.

The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing, and the functions of the above-described embodiments are realized by the processing.

As described above, the present invention also has the effect that other data and control signals can be newly exchanged while conforming to existent interface specifications.

Furthermore, the present invention also has the effect that various kinds of signals can be exchanged by superposing a desired signal without influencing existent interface signals.

In addition, the present invention also has the effect that the number of signal lines used can be reduced without reducing the functions of interfaces.

The individual components shown in outline or designated by blocks in the drawings are all well-known in the interface control method and apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An interface control apparatus comprising:

a plurality of transmission channels each including at least a pair of signal lines for transmitting an interface signal;

transmission means for transmitting a first signal using low voltage differential signaling via both signal lines of a pair of signal lines of said plurality of transmission channels;

reception means for receiving the first signal transmitted via said pair of signal lines of said plurality of transmission channels;

modulation means for modulating a second signal with a high-frequency signal and providing the modulated signal to a single signal line of said pair of signal lines, in a direction from said reception means toward said transmission means; and demodulation means for extracting the modulated signal from that single signal line, and demodulating the extracted signal.

2. An interface control apparatus according to claim 1, wherein a frequency of the high-frequency signal is higher than a several-order harmonic content of a frequency of an interface signal propagated through the transmission channel.

3. An interface control apparatus according to claim 1, wherein said modulation means further superposes the high-frequency signal used for the modulation on a signal line of a transmission channel other than the signal line of the transmission channel where the modulated signal is superposed, and wherein said demodulation means extracts the high-frequency signal from the signal line and uses the extracted signal for the demodulation of the modulated signal.

4. An interface control method comprising:

transmitting a first signal comprising an interface signal using low voltage differential signaling over one of a plurality of transmission lines, each including at least a pair of signal lines, the first signal being transmitted from a transmission end to a reception end using both signal lines of said pair of signal lines;

modulating a second signal with a high-frequency signal, to produce a modulated signal;

providing the modulated signal to a single signal line of said pair of signal lines, the modulated signal being provided to the single signal line in a direction from the reception end toward the transmission end; and extracting the modulated signal from the single signal line, and demodulating the extracted signal.

5. An interface control method according to claim 4, wherein said modulating step further includes superposing the high-frequency signal used for the modulation on a signal line of a transmission channel other than the signal line of the transmission channel where the modulated signal is superposed, and wherein said demodulating step includes extracting the high-frequency signal from the signal line and using the extracted signal for the demodulation of the modulated signal.

6. An interface control apparatus comprising:

a plurality of transmission channels each including at least a pair of signal lines for transmitting an interface signal;

a transmitter circuit, arranged to transmit a first signal using low voltage differential signaling via both signal lines of a pair of signal lines of said plurality of transmission channels;

a receiver circuit, arranged to receive the first signal transmitted via said pair of signal lines of said plurality of transmission channels;

a modulator, arranged to modulate a second signal with a high-frequency signal and to provide the modulated signal to a single signal line of said pair of signal lines; and a demodulator, arranged to extract the modulated signal from that single signal line, and to demodulate the extracted signal.

7. An interface control apparatus according to claim 6, wherein a frequency of the high-frequency signal is higher than a several-order harmonic content of a frequency of an interface signal propagated through the transmission channel.

8. An interface control apparatus according to claim 6, wherein said modulator further superposes the high-frequency signal used for the modulation on a single signal line of a transmission channel other than the single signal line of the transmission channel where the modulated signal is superposed, and wherein said demodulator extracts the high-frequency signal from the single signal line and uses the extracted signal for the demodulation of the modulated signal.

* * * * *